US007343933B2

(12) United States Patent
McBeth et al.

(10) Patent No.: US 7,343,933 B2
(45) Date of Patent: Mar. 18, 2008

(54) MULTI-PORT FLOW SELECTOR MANIFOLD VALVE AND MANIFOLD SYSTEM

(75) Inventors: Russell Eric McBeth, The Woodlands, TX (US); Ronald James Manson, Spring, TX (US)

(73) Assignee: Cameron International Corporation, Houston, TX (US)

( * ) Notice: Subject to any disclaimer, the term of this patent is extended or adjusted under 35 U.S.C. 154(b) by 82 days.

(21) Appl. No.: 11/092,364

(22) Filed: Mar. 29, 2005

(65) Prior Publication Data

US 2005/0236051 A1  Oct. 27, 2005

Related U.S. Application Data

(63) Continuation-in-part of application No. 10/842,116, filed on May 10, 2004, which is a continuation-in-part of application No. 10/833,901, filed on Apr. 27, 2004.

(51) Int. Cl.
*F16K 11/074* (2006.01)
(52) U.S. Cl. .............................. 137/625.11; 137/625.46; 137/874
(58) Field of Classification Search ............ 137/625.11, 137/625.46, 625.47, 874, 876; 251/172, 251/174
See application file for complete search history.

(56) References Cited

U.S. PATENT DOCUMENTS

| 825,370 | A | 7/1906 | Zurbuch |
| 1,556,407 | A | 10/1925 | Bottcher |
| 2,391,196 | A | 12/1945 | Sanderson |
| 2,821,998 | A | 2/1958 | Mayhew |
| 2,835,273 | A | 5/1958 | McDonald |

(Continued)

FOREIGN PATENT DOCUMENTS

WO WO 02/20938 3/2002

OTHER PUBLICATIONS

Bettis Actuators & Controls, "Multiport Flow Selector," copyright 1996.

(Continued)

*Primary Examiner*—John Rivell
(74) *Attorney, Agent, or Firm*—Fletcher Yoder

(57) ABSTRACT

A multi-port flow selector manifold valve includes a plurality of inlet ports adapted to be coupled to a fluid source, a test outlet adapted to communicate with at least one of the plurality of inlet ports, and a production outlet adapted to communicate with at least at least one of the plurality of inlet ports. A flow path is rotatably disposed between the test outlet and the plurality of inlet ports such that the flow path is rotatably alignable with each of the plurality of inlet ports. The flow path includes an inlet flow path having a longitudinal direction of flow and adapted to communicate with one of the plurality of inlet ports, an outlet flow path having a direction of flow substantially parallel to the inlet direction of flow and adapted to communicate with the test outlet, and an offset portion disposed between the inlet flow path and the outlet flow path. The offset portion has a direction of flow with an angle of less than 90 degrees to the outlet direction of flow.

The present invention further includes a manifold valve system using the previously described multi-port flow selector manifold valve and a method of use of the multi-port valve and manifold system.

3 Claims, 12 Drawing Sheets

U.S. PATENT DOCUMENTS

| | | | |
|---|---|---|---|
| 2,840,109 A | | 6/1958 | Wadleigh |
| 2,996,083 A | | 8/1961 | Huska |
| 3,246,667 A | * | 4/1966 | Pemberton ............. 137/625.11 |
| 3,536,098 A | * | 10/1970 | Cunningham ................ 137/876 |
| 3,545,474 A | | 12/1970 | Brown |
| 3,545,489 A | | 12/1970 | Brown et al. |
| 3,581,768 A | * | 6/1971 | Conti .......................... 137/874 |
| 3,674,123 A | | 7/1972 | Lewis et al. |
| 3,780,756 A | | 12/1973 | Pennington |
| 4,133,418 A | | 1/1979 | Van Bilderbeek |
| 4,207,922 A | | 6/1980 | Andrieux et al. |
| 4,366,839 A | | 1/1983 | Slavin |
| 4,372,337 A | * | 2/1983 | Holzenberger .............. 137/874 |
| 4,396,036 A | | 8/1983 | Horikawa et al. |
| 4,523,606 A | | 6/1985 | Gould et al. |
| 4,807,662 A | | 2/1989 | Verne |
| 4,886,401 A | | 12/1989 | Andrews et al. |
| 4,989,641 A | | 2/1991 | Jones et al. |
| 5,046,522 A | | 9/1991 | Le Devehat et al. |
| 5,127,429 A | | 7/1992 | Kempf et al. |
| 5,188,151 A | | 2/1993 | Young et al. |
| 5,261,451 A | * | 11/1993 | Spencer .................. 137/625.11 |
| 5,656,090 A | * | 8/1997 | Preston et al. ......... 137/625.11 |
| 5,862,833 A | | 1/1999 | Perez |
| 5,927,330 A | | 7/1999 | Minton et al. |
| 6,000,430 A | | 12/1999 | Nafz |

OTHER PUBLICATIONS

Ring-O Valve, "3-Way Subsea Forged Body Ball Valve".
FMC Energy System, "Poppet Diverter Valves," copyright 2004.
NU-CON, "Rotary Tube Selector Valves".
Republic Catalog, "Rockwell-Nordstrom Class B Iron and ANSI Steel Multiport Lubricated Plug Valves," copyright 1977.
"Framo Multiport Selector Manifold for Topside and Subsea Applications".
Oil States Industries, "Onshore Oil and Gas Land," copyright 2002-2004.
International Search Report with Written Opinion, dated Jul. 6, 2005, for PCT/US2005/009430.
International Search Report with Written Opinion, dated Jul. 6, 2005, for PCT/US2005/009609.

* cited by examiner

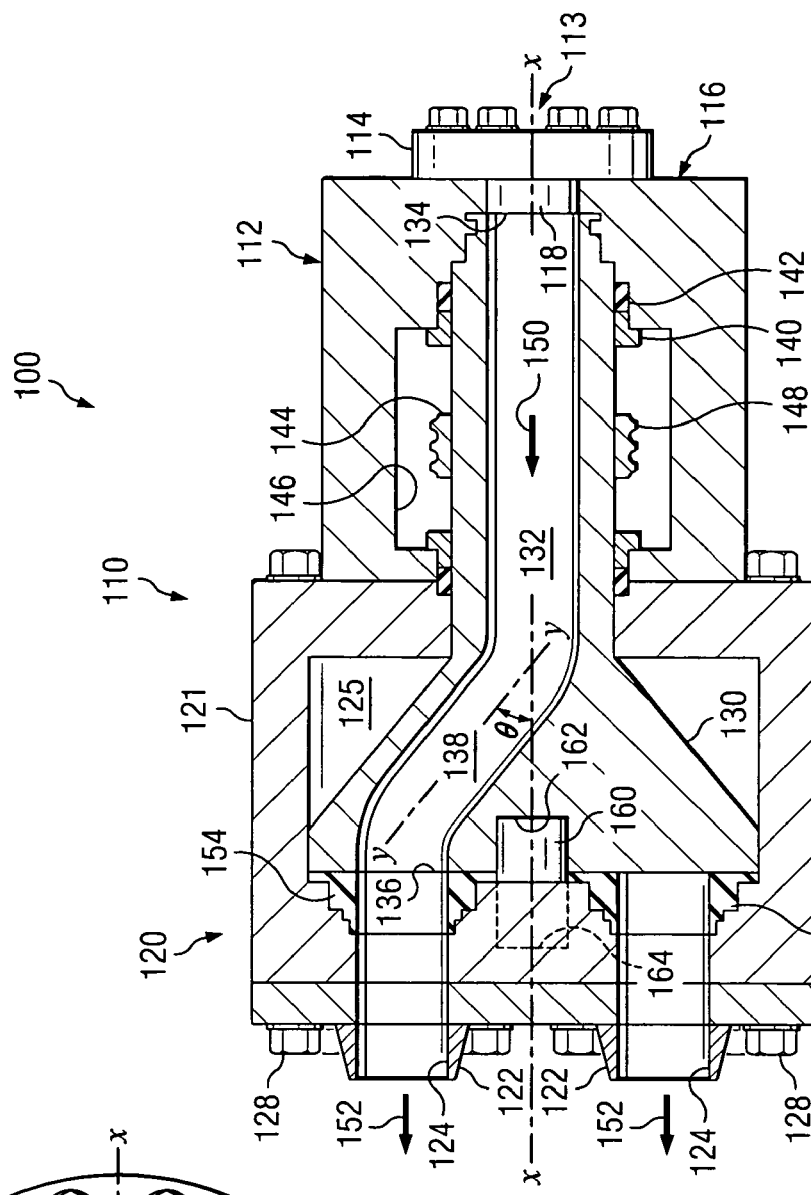
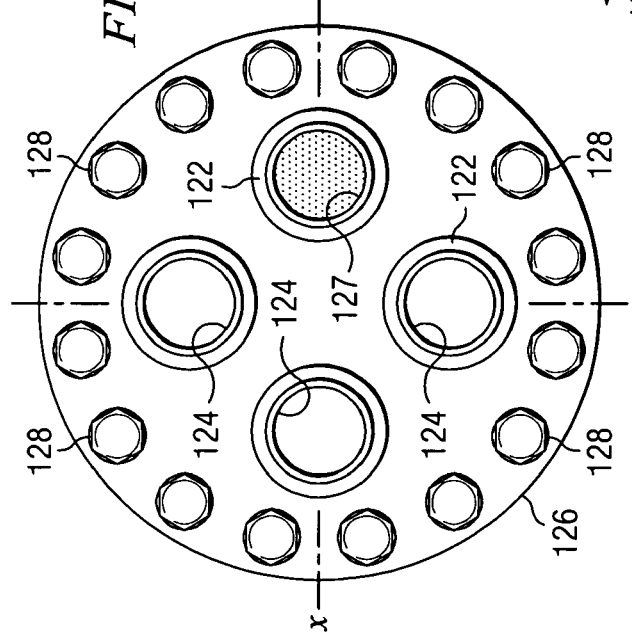
*FIG. 1A*
*FIG. 1B*

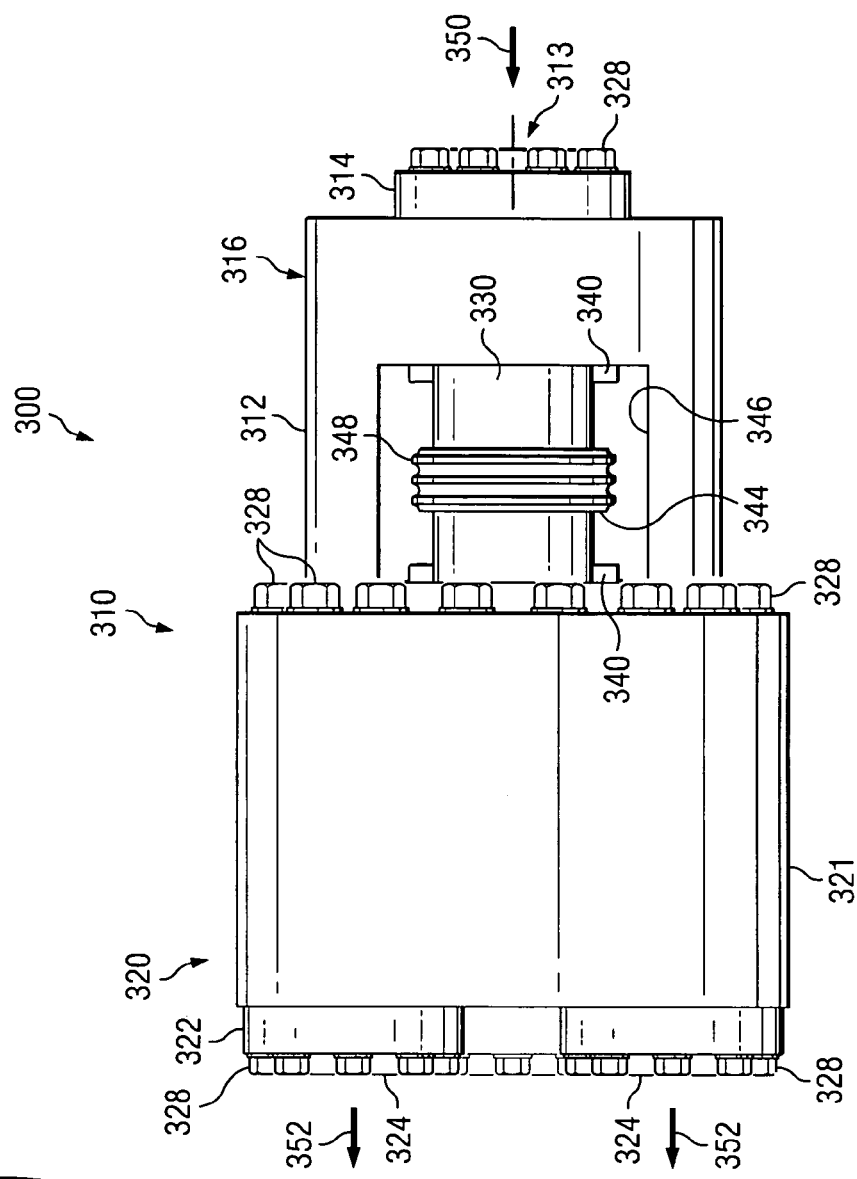
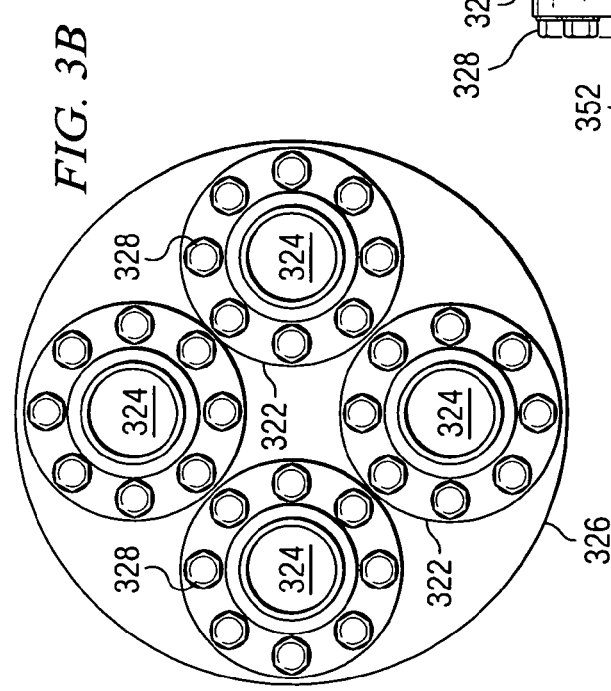
FIG. 3B
FIG. 3A

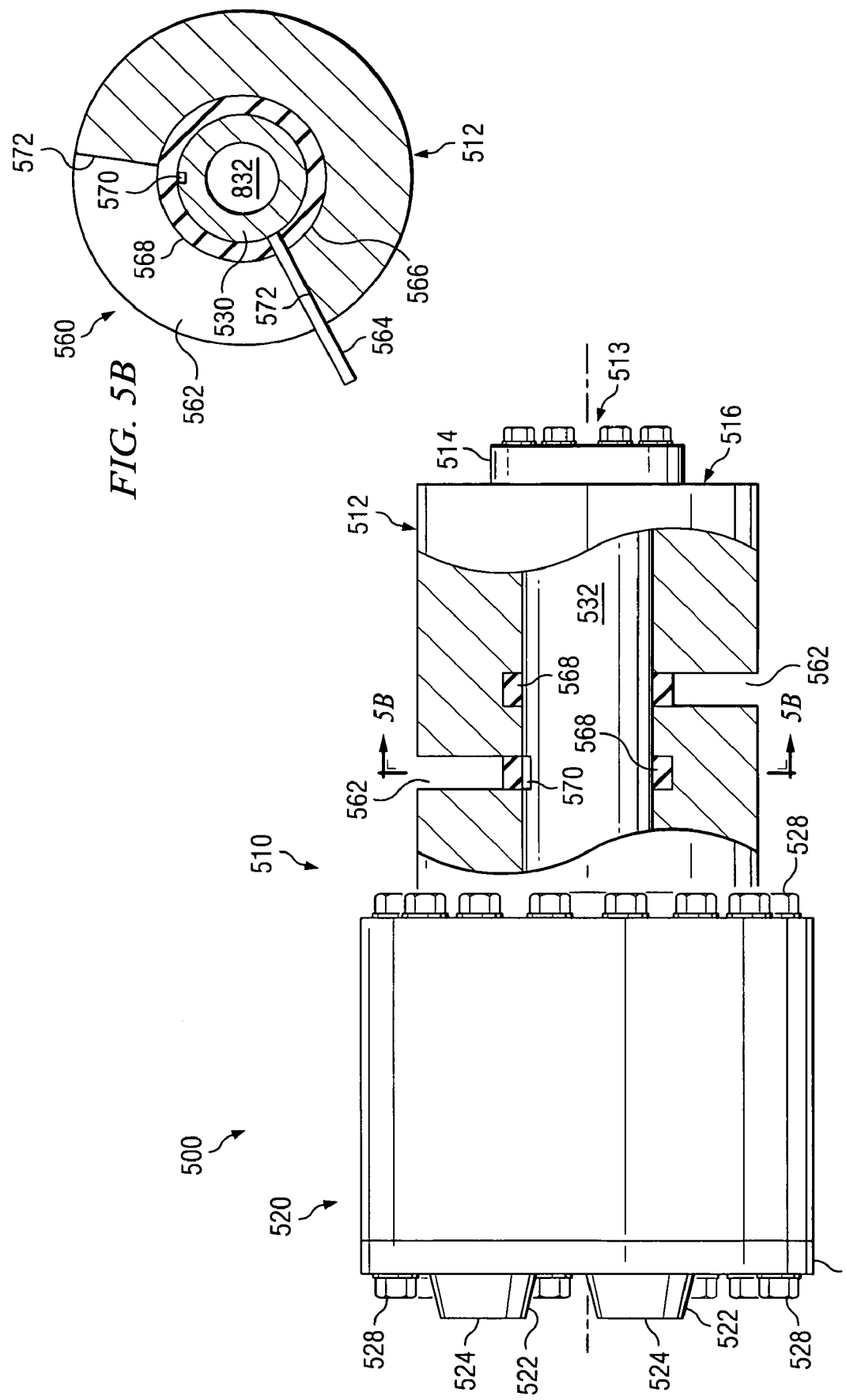

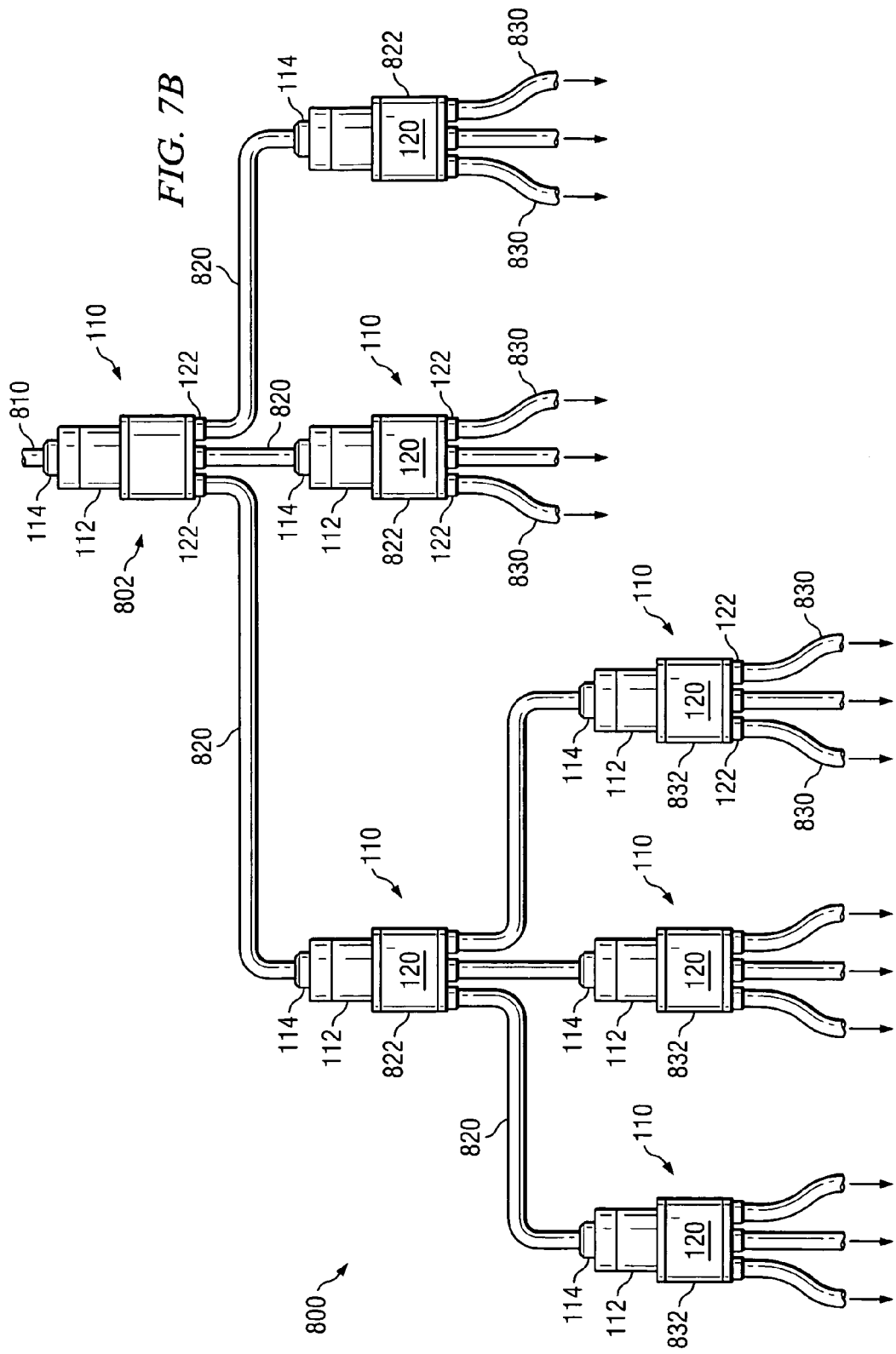

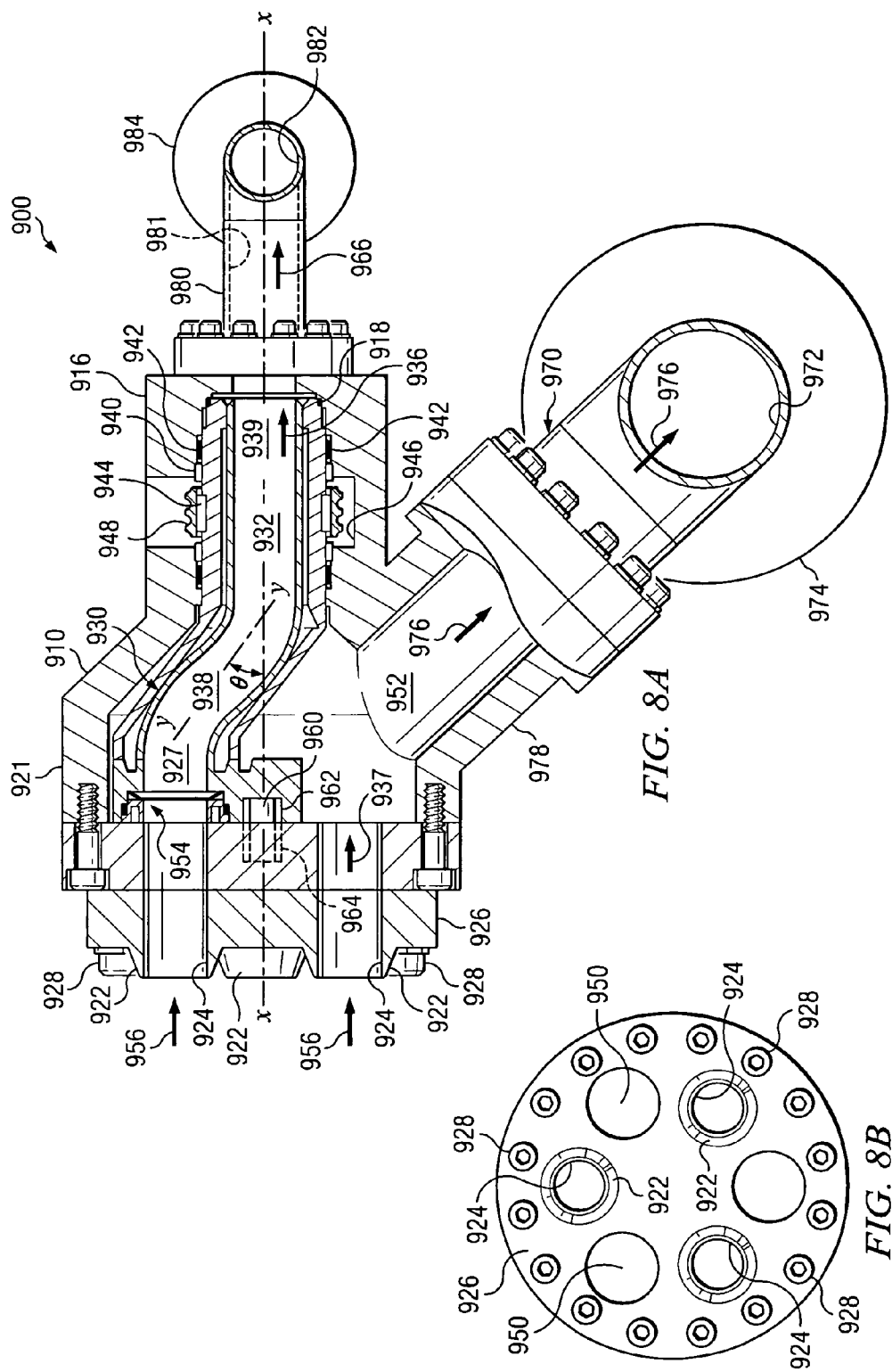

MULTI-PORT FLOW SELECTOR MANIFOLD VALVE AND MANIFOLD SYSTEM

This application is a continuation-in-part of U.S. application Ser. No. 10/842,116 filed on May 10, 2004, which is a continuation-in-part of U.S. patent application Ser. No. 10/833,901, filed on Apr. 27, 2004.

TECHNICAL FIELD

This invention relates to valves, and more particularly to multi-port valves in a manifold application.

BACKGROUND

Valves have a variety of applications in numerous industries. In the production of oil, natural gas, and other fluids and gases, valves are a necessity in any operation due to the need for directing the flow of fluids (gas, water, and oil) between wells, pumps, vessels, and refineries. In general, oil and gas development includes well drilling, production (bringing fluids to the surface), treating the various mixtures of oil and gas, and the transportation to oil refineries and gas sales points. Many production fields consist of numerous wells producing fluids comprising natural gas, oil and water individually, simultaneously, or collectively. Generally, the fluids from the wells are transported to a central collection or gathering station to combine or further separate them for subsequent aspects of development, such as refining, gas sales, etc. Additionally, testing from specific flow sources is often required to ensure the quality of the fluids produced. Accordingly, the production of each well is generally directed to a manifold system that communicates the well products to various testing and/or production destinations upon production. Additionally, the numerous destinations for materials require the use of a myriad of valves and pipe systems to direct flow to a desired location.

Using multi-port valves is well known. However, most multi-port valves are designed to have multiple inlets and a single outlet. Additionally, most multi-port systems direct the flow from an opening through a chamber with selectively opened and closed outlets for fluid. The use of these multi-port valves allows multiple inputs to be directed to a single destination. Though appropriate for some applications, the multi-outlet valves operate only to direct fluid to a single destination, absent additional piping and valve systems.

In addition to gathering production fluids from wells, often different types of fluids or other matter is required to be sent down into the well. For example, treating solutions to dissolve terrestrial rock formations and scale compounds must be directed down-hole to facilitate production. Additionally, pipe scrapers, commonly known as pipeline "pigs" may be required to be propelled through the piping systems to the wells by pressurized fluid flow to remove scale and debris that can limit production rates. Each pipeline pig requires a launcher and a receiver. In prior art, the piping configuration necessary to support pigging operations is normally extensive. A need exists for a more compact multi-flow system in offshore, environmentally sensitive or industrial plant settings where space is a premium.

Prior art manifold systems can be extremely cumbersome, especially with respect to the piping architecture required for manifolds accepting large numbers of production lines from wells or other sources. Additionally, the configuration of most prior art manifold systems requires complex piping arrangements that require large amounts of space relative to the number of producing sources. For testing purposes, conventional manifolds require additional isolation valves for each production line to be tested, thus increasing capital cost, weight, space and maintenance cost.

SUMMARY

A multi-port flow selector manifold valve includes a plurality of inlets adapted to be coupled to a fluid source, a test outlet adapted to selectively communicate with at least one of the plurality of inlet ports, and a production outlet adapted to communicate with at least one of the plurality of inlet ports. A flow path is rotatably disposed between the test outlet and the plurality of inlets such that the flow path is rotatably alignable with each of the plurality of inlets. The flow path includes a flow path inlet having a longitudinal direction of flow and adapted to communicate with one of the plurality of inlets, a flow path outlet having a direction of flow substantially parallel to the inlet direction of flow and adapted to communicate with the test outlet, and an offset portion disposed between the flow path inlet and flow path outlet. The offset portion has a direction of flow with an angle of less than 90 degrees to the outlet direction of flow. The manifold valve system may include a port selector that is selectably alignable with each of the plurality of inlet ports. The system may also include blind seats that position the flow path between two of the plurality of inlets such that each of the plurality of inlets communicates with the production outlet. Additionally, the system may include a production cavity between the plurality of inlets and the production outlet.

A manifold system includes a plurality of production sources adapted to provide a throughput to a plurality of multi-port flow selector manifold valves. Each of the manifold valves includes a corresponding test outlet and a corresponding production outlet, and each of the manifold valves is coupled to at least two of the plurality of production sources. A production line is coupled to production equipment, and each of the production outlets of the plurality of manifold valve systems is coupled to the production line. A test line is coupled to test equipment, and each of the test outlets of the plurality of manifold valve systems is coupled to test equipment.

A method of simultaneously testing and producing fluid from multiple fluid sources using the multi-port flow selector valve is also disclosed.

DESCRIPTION OF DRAWINGS

FIG. 1A is a cutaway plan view of a 4-way valve in accordance with an embodiment of the present invention.

FIG. 1B is an end view of the valve of FIG. 1A.

FIG. 3A is a cutaway plan view of a 4-way valve that includes flanged outlets.

FIG. 3B is an end view of the valve of FIG. 3A.

FIG. 5A is a cutaway plan view of a 3-way valve with a manual lever-type actuator.

FIG. 5B is a cross-sectional view of the valve of FIG. 5A along the line A-A'.

FIG. 7B is a multiple pipe line administration system that implements a parallel configuration.

FIG. 8A is a cross-sectional view of a multi-port flow selector manifold valve.

FIG. 8B is an end-view of the valve of FIG. 8A.

Like reference symbols in the various drawings indicate like elements.

DETAILED DESCRIPTION

Figure 2:
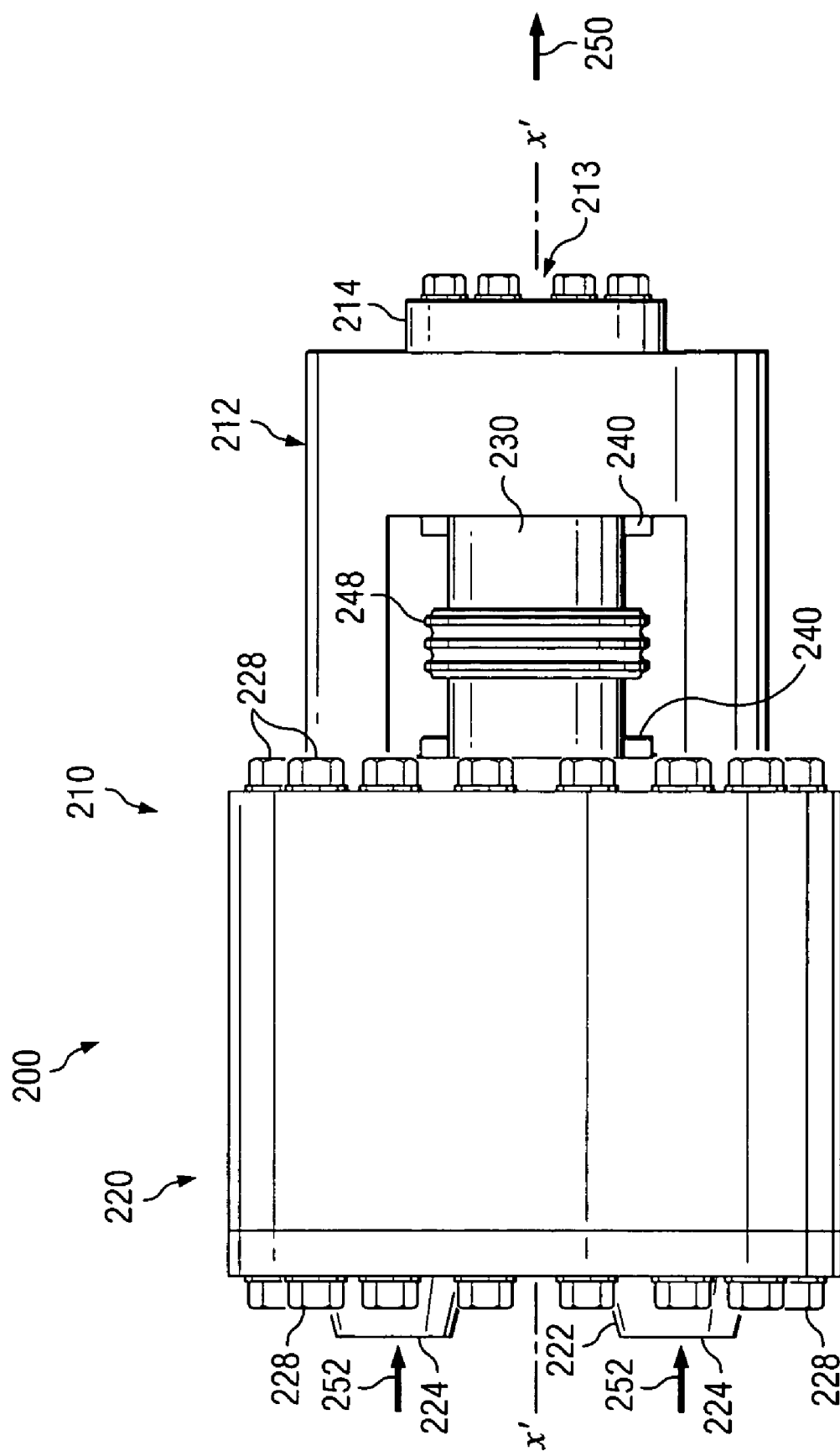
FIG. 2 is a plan view of a valve having a reversed direction of flow.

Described in more detail below is a multi-port selector valve having one inlet and multiple outlets or one outlet and multiple inlets. Though numerous embodiments and implementations are shown, it should be understood that many additional embodiments and implementations may be used in accordance with the teachings of the present invention. For the purposes of this application, the term "fluid" includes oil, gas, water, or any other matter either individually or in any combination. Other matter may include, but is not limited to entrained solids, suspended solids, and slurries of solids.

Referring to FIGS. 1A and 1B, a valve system 100 includes a body 110. In the embodiment shown, the body 110 includes an inlet port module 112, an outlet port module 120, and a port selector 130. The inlet port module 112 has an inlet port body 116 adapted to connect to a fluid source through an inlet port flange 114. The inlet port body 116 may be adapted to partially enclose the port selector 130. In the embodiment shown, the inlet port body 116 may include an open yoke 146. The port selector 130 is coupled to the inlet port body 116 via bushings 140. Seals 142 may also be included to prevent fluid entering or exiting the inlet port module 112 from leaking out of the valve body 116.

The inlet port flange 114 has an opening 113 that allows fluid to enter the valve body 110. The inlet port body 116 may also include a bearing 118 for rotatably coupling the inlet port body 114 to the port selector 130.

The outlet port module 120 includes an outlet port body 121 and a plurality of welded outlet ports 122 formed in an outlet plate 126. The four welded outlet ports 122 are shown as welded outlet ports 122, but any suitable type of outlet port may be used. Welded outlet ports 122 define outlets 124. The welded outlet ports 122 may be adapted to be coupled to fluid destinations (not explicitly shown), and each outlet port 122 may be spaced radially outward from the central axis of the port selector, herein labeled the "X-X" axis. Outlet plate 126 is attached to the outlet port module 120 using fasteners 128. The fasteners 128 may be any suitable type of fastener, such as a screw, bolt, nut and bolt assembly, or other suitable fastener. Outlet plate 126 may also be welded or integral to outlet port module 120.

The port selector 130 may be a rotatable member that includes a flow path 132 formed within, such that the flow path 132 may allow the transfer of fluid from the opening 113 to one of the plurality of outlets 124. The port selector 130 is disposed within the valve body 110 such that it passes through portions of the inlet port module 112 and the outlet port module 120. The flow path 132 formed within the port selector 130 has a path inlet 134, a path outlet 136, and an offset portion 138. Offset portion 138 includes a longitudinal flow direction Y-Y that preferably defines an angle $\theta$ of less than 90 degrees from the central longitudinal axis X-X, so that the flow path 130 may be operable to provide communication between the opening 113 and one of the plurality of outlets 124. The offset portion 138 is angled so that as the port selector 130 is rotated within the valve body 110, the path outlet 136 may be aligned with one of the plurality of outlets 124. Additionally, a blinded outlet 127 may be formed in the endplate 126 such that when the path outlet 136 is aligned with the blinded outlet 127, no fluid may exit the valve system 100.

An advantage of the offset portion 138 having an angle $\theta$ less than 90 degrees is that certain operations, such as launching or receiving a pipe scraper through the valve system 100, are possible. A pipe scraper, or pipe line "pig" as they are commonly referred to in the petroleum industry, is routinely propelled through the pipes from a pipe line launcher in production operations by using pressurized fluid as a propellant. Additionally or alternatively, the pipeline scraper could be coupled to a pipeline scraper receiver. In accordance with the present invention, the smaller the angle $\theta$, the less the amount of resistance a pipe scraper, or pipe line "pig" encounters when passing through the valve. Accordingly, an angle $\theta$ of greater than 90 degrees may be prohibitive in certain applications. The pipeline scraper may be propelled from the launcher or toward the receiver using a pressurized fluid source.

Other advantages of having a longitudinal flow path with an $\theta$ angle of less than 90° to the first flow path include minimizing scale and paraffin deposition in the flow path due to minimizing pressure drop in the offset position 138; minimizing erosion of the internal walls of the flow path in the offset portion 138; and reducing the likelihood of cavitation in the offset portion 138.

In the embodiment shown, an actuator coupling 144 is disposed circumferentially about the port selector 130. In the configuration illustrated by FIG. 1A, the open yoke 146 allows rotational energy to be transmitted from a rotation power source (not shown) via a chain, belt, gear, or other suitable connector to engage the teeth 148 of the actuator coupling 144. As the port selector 130 is rotated within the valve body 110, the path outlet 136 may be aligned with one of the plurality of outlets 124 defined by the welded outlet ports 122 formed in the end plate 126. This alignment allows fluid to pass through open outlets 124 or be stopped by a blinded outlet 127.

In the embodiment shown, the port selector 130 is operable to align the flow path 132 with one of four outlets 124, although in other embodiments, there may be more or less than four outlets 124 formed within the outlet port module 120. Additionally, outlet seals 154 may be coupled to outlet port module 120 to ensure a positive connection with the flow path 132 when the flow path 132 is aligned with the outlet port 122. The path inlet 134 has a first direction of flow 150 that is substantially parallel with the central longitudinal "X-X" axis. The path outlet 136 has a second direction of flow 152 that is substantially parallel to the first direction of flow 150 but offset from the central X-X axis.

The multi-port selector valve 100 also includes a trunnion 160 adapted to rotatably couple the port selector 130 to the outlet port module body 121. The trunnion pin 160 may be either adapted to insert into corresponding pin recess 164 formed in a portion of the outlet port module body 121 and a port selector recess 162 formed in the port selector 130. Alternatively, the trunnion pin may be formed integrally with either the port selector 130 and adapted to be inserted in the pin recess 164 or as part of the outlet port module body 121 and inserted into the port selector recess 162. Additionally, the outlet seals 154 may be adapted to provide pressure against the port selector 130, in order to maintain the relative position of the port selector 130 within the valve body 110, and/or to maintain the alignment between the flow path 132 and one of the plurality of outlets 124. The outlet seals 154 may be installed with one or more than one of the outlet ports 122. In one implementation, an outlet seal 154 may provide sealing properties that provide a seal to the selected outlet port(s) 122 with which it installed and/or provide a seal preventing pressure within the valve body 110 from entering into outlet port(s) 122.

FIG. 2 illustrates an enclosed valve system 200 having a central longitudinal "X'-X'" axis and having substantially corresponding features of the valve illustrated by FIGS. 1A and 1B. Valve system 200 includes an embodiment in which the outlet port module and inlet port modules are reversed from the configuration illustrated by FIGS. 1A and 1B. For example, in FIG. 2, the outlet port module 120 is replaced by inlet port module 220, which includes a plurality of inlet ports 222 adapted to be coupled to a fluid source, and openings 224 formed in end plate 226. Each of the openings 224 may be adapted to correspond with a first direction of flow 252 substantially parallel to the central longitudinal X'-X' axis of the valve body 210.

Fasteners 228 may be used to couple the end plate 226 to the inlet port module 220, as well as the inlet port module 220 to the outlet port module 212. Additionally, the embodiment shown includes an outlet flange 214 with an outlet 213 formed there through. The outlet flange 214 may be adapted to couple the valve system 200 to an associated fluid destination (not explicitly shown). The outlet 213 corresponds to a second direction of flow 250, which is substantially parallel to the first direction of flow 252. Also not shown is the flow path formed within the port selector 230 that is adapted to communicate between one of the plurality of openings 224 and the outlet 213 when the flow path, similar to the one depicted at reference number 132 of FIG. 1A, is rotatably aligned with one of the plurality of openings 224.

Additionally, in the embodiment shown, but not necessary to the operation of the invention, the second direction of flow is shown to be centered substantially about the central longitudinal X'-X' axis of the valve body.

As stated above, most features of the valve system 200 are analogous to those of valve system 100 as depicted in FIGS. 1A and 1B. As such, the valve system 200 also includes an actuator coupling 240 that includes teeth 248 that, when coupled to an actuator, is operable to rotate the port selector 230 so that the flow path not shown, may be aligned with one of the plurality of openings 224.

FIGS. 3A and 3B illustrate an alternate embodiment of a valve system 300. The major difference as illustrated by FIGS. 3A and 3B is that the valve system 300 does not include an end plate. Rather, the valve system 300 includes flanged outlet ports 322. Each of these flanged outlet ports 322 may be coupled to the outlet port module body 321 by welding or using fasteners 328, such as bolts, rivets, or other suitable fasteners. Similar to the valve system 100 of FIGS. 1A and 1B, the valve system 300 includes outlets 324 adapted to direct fluid passing through the valve system 300 to a fluid destination. The fluid or other matter enters the valve system 300 through an opening 313 defined by an inlet flange 314 coupled to the inlet port module body 316 of the inlet port module 312. The valve body 310 may be assembled by using fasteners 328 to couple the outlet port module body 321 of the outlet port module 320 to the inlet port module body 316 of the inlet port module 312. Additionally, the port selector 330 may have actuator coupling 344 having teeth or gears 348 disposed within an open yoke 346 disposed within the inlet port module body 316. Upon transmission of rotational energy via a gear, chain, belt or other suitable connection to the actuator coupling 344, the port selector 330 will rotate a flow path formed within the port selector 330 similar to that shown at number 132 of FIG. 1A, to align the path outlet (also not shown) with one of the plurality of outlets 324.

Figures 4A, 4B:
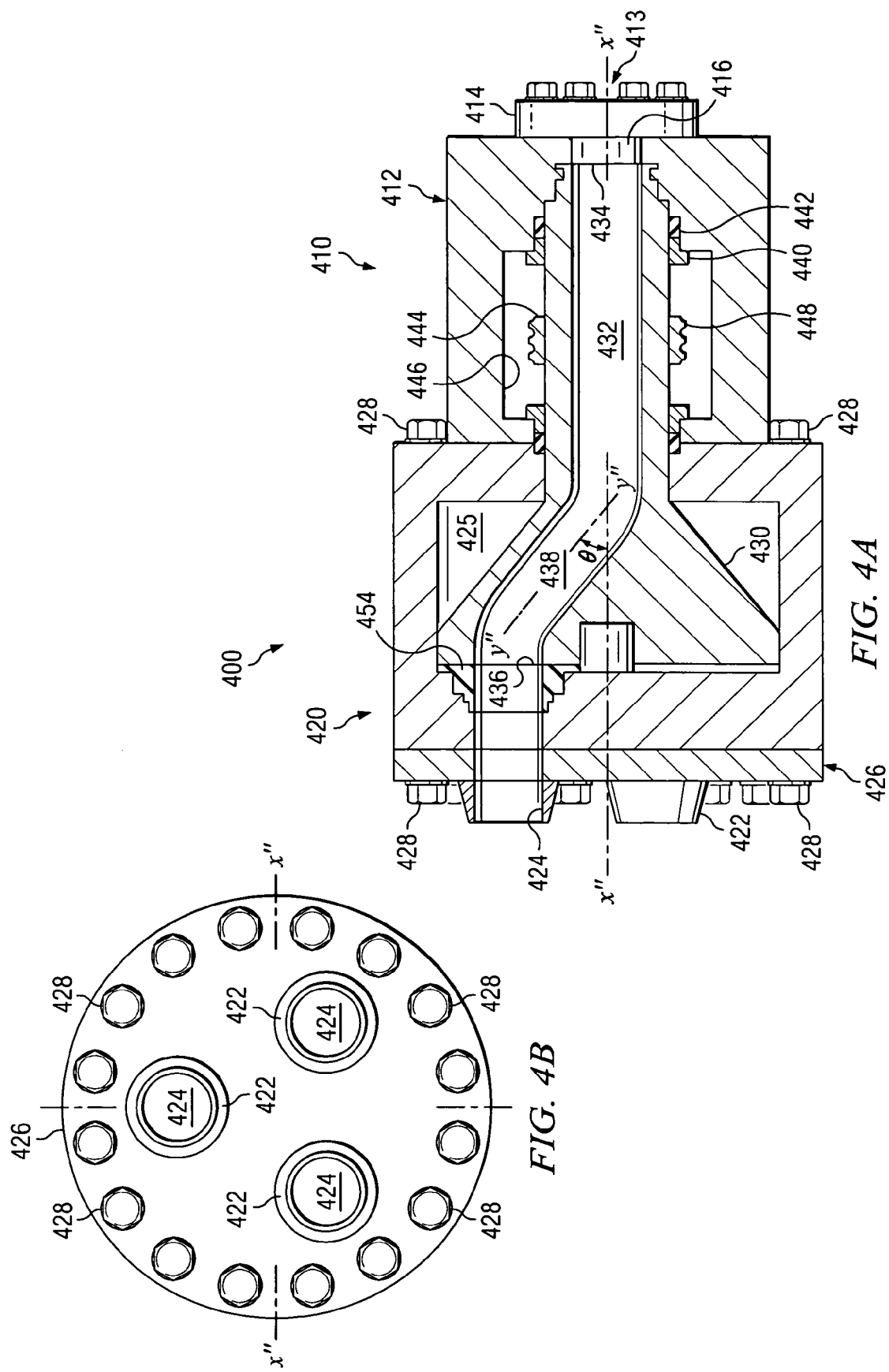
FIG. 4A is a cutaway plan view of a 3-way valve with welded outlets.
FIG. 4B is an end view of the valve of FIG. 4A.

FIGS. 4A and 4B illustrate an alternative multi-port valve system 400 that includes three outlets 424 defined by the welded outlet ports 422 formed in the end plate 426 of the outlet port module 420. Additionally, no trunnion pin is present in the embodiment shown in FIG. 4A. According to this embodiment, the pressure of the fluid moving through the flow path 432 provides the necessary pressure along an axis X"-X" to maintain pressure of the port selector 430 against the valve seat 454 when the flow path 432 is aligned with one of the three outlets 424. Similar to the embodiment shown in FIG. 1A, the flow path 432 includes a path inlet 434 and a bearing 416 to rotatably couple the port selector 430, including the flow path 432 with the inlet flange 414 and the opening 413, respectively. The flow path 432 also has an offset portion 438 that includes a longitudinal flow direction Y"-Y" that preferably defines an angle θ of less than 90 degrees from the central longitudinal axis X"-X" so that the flow path is able to provide communication between the opening 413 and one of the plurality of outlets 424.

In one implementation illustrated in FIG. 4A, an actuator may be located within a closed yoke 446 to provide rotation of the actuator coupling 444. Seals 442 and bushings 440 may also be provided to ensure that the port selector 430 is maintained in proper physical relation to the valve body 410, and/or that no pressurized fluid enters the open yoke 446 of the inlet port module 410.

FIGS. 5A and 5B illustrate an in-line valve system 500 that allows manual manipulation of the port selector 530 by a lever system 560. The lever system 560 is best described in conjunction the cross section shown by FIG. 5B. The cross section A-A' of FIG. 5B illustrates one or more port recesses 562 formed in the valve body 510 of the valve system 500. An actuator ring 568 may be disposed circumferentially about the port selector 530 that includes a lever recess 566 adapted to receive a lever 564. Upon inserting the lever 564 into the recess 566, a user can rotate the port selector 530 within the valve body 510 to align the flow path 532, which is formed in the port selector 530 in a similar fashion as the flow path 132 of FIG. 1A, to align the path outlet (not explicitly shown) with one of the plurality of outlets 524 defined by the welded outlet ports 522 of the outlet port module 520.

A key 570 may also be included. As depicted, the key 570 may couple the port selector 530 to the actuating ring 568. When the port selector 530 is rotated so that the flow path is aligned with one of the plurality of outlets 522, one of two port recess surfaces 572 in any port recess 562 engages the lever 564 to stop the rotation of the port selector 530 and therefore the flow path 532. The lever system 560 allows a user to manually rotate the flow path 532 of the port selector 530 so that the flow path 532 communicates between the opening 513 defined by the inlet flange 514 of the inlet port module 512 and the outlet 524 defined by the outlet port 522 formed in the end plate 526.

Multiple port recesses 562 may be formed in a given valve body 510. Where multiple port recesses 562 are present, the lever 564 may be removed from a first lever recess 566 in the actuator ring 568 and inserted into a second or subsequent lever recess 566 in the actuator ring 568 to allow further manual rotation of the port selector 530.

Figure 6A:
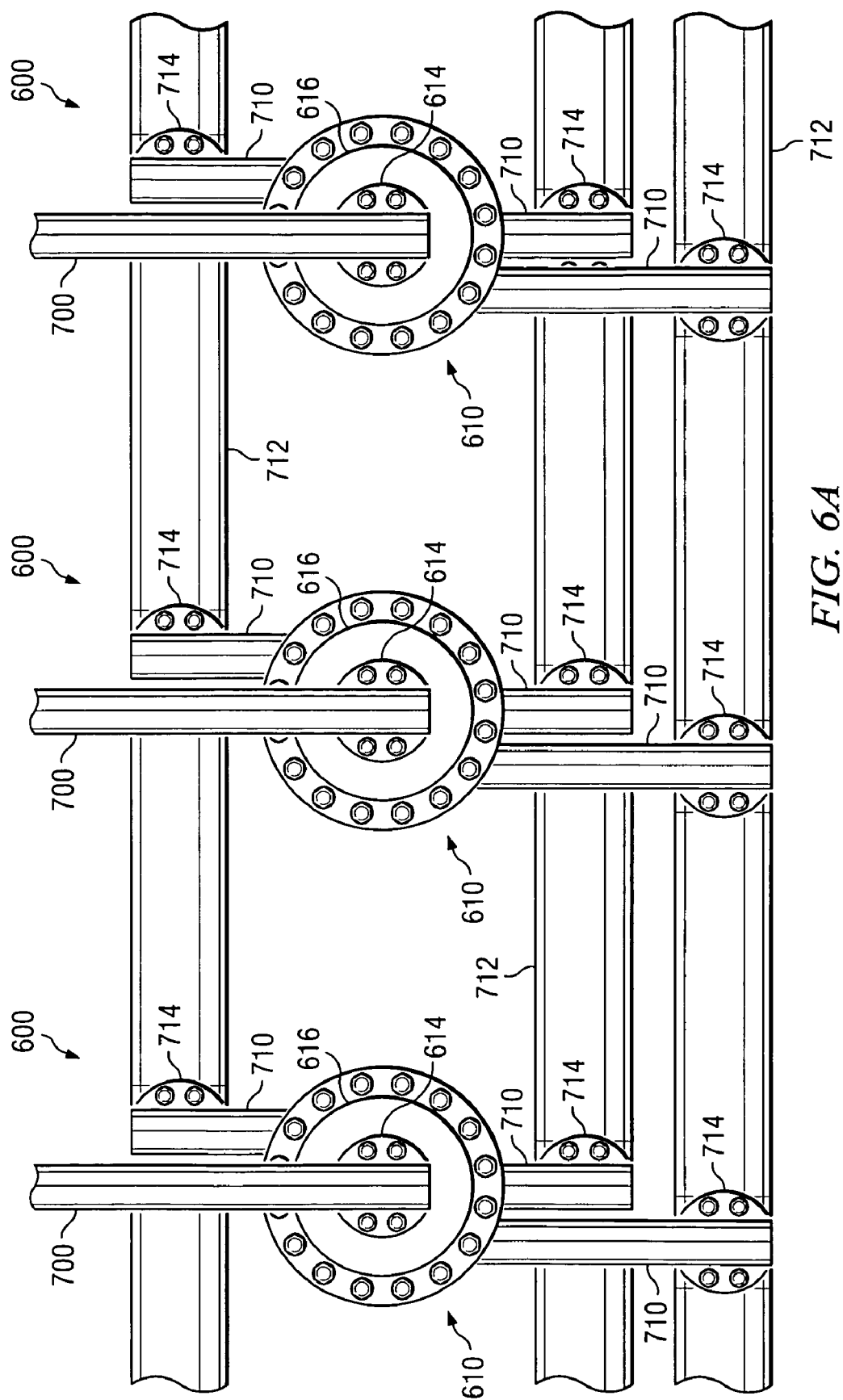
FIG. 6A is a plan view of a manifold system that incorporates one or more valves in accordance with embodiments of the present invention.
Figure 6B:
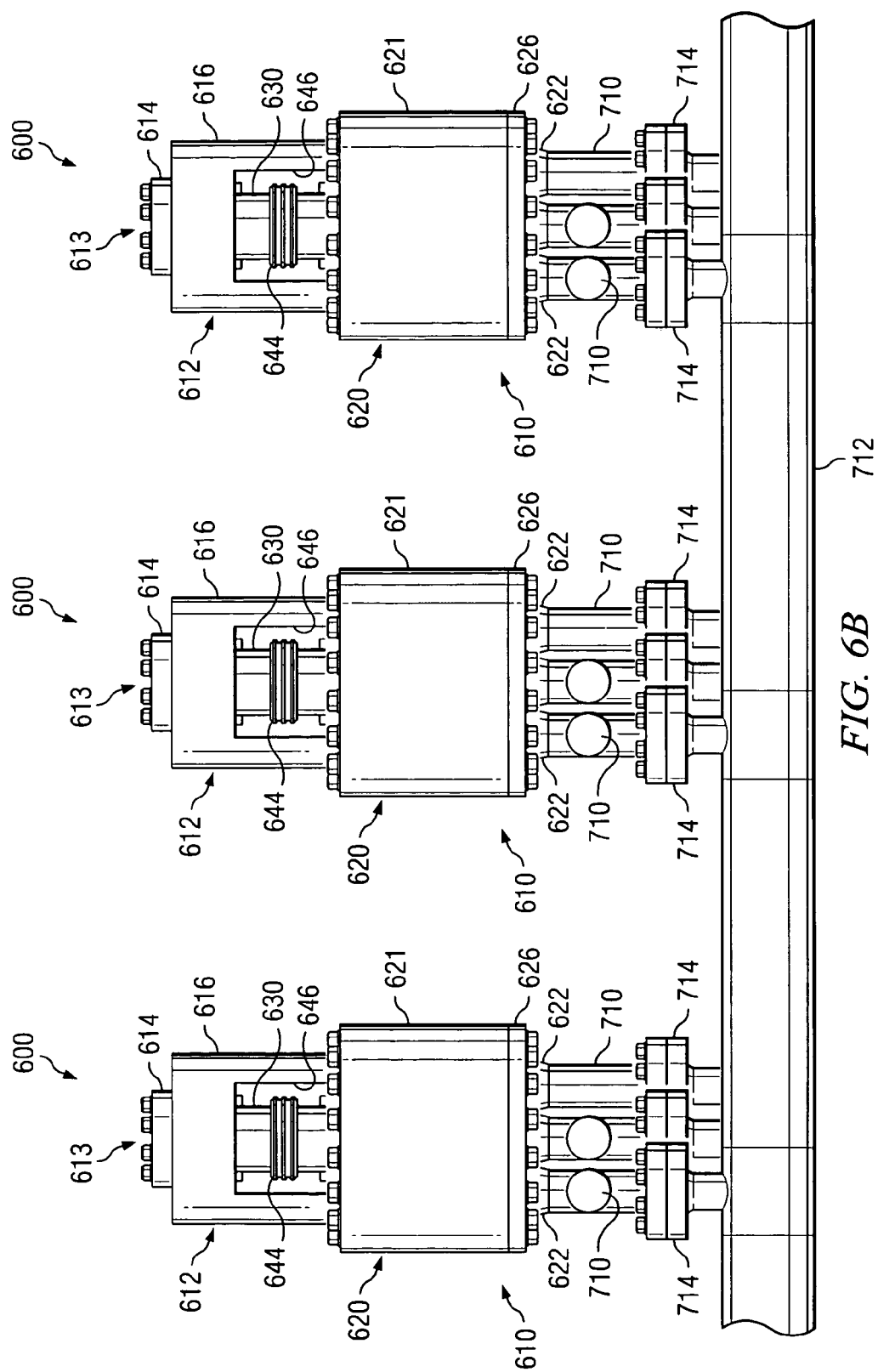
FIG. 6B is a side view of the manifold system depicted in FIG. 6A.

FIGS. 6A and 6B illustrate a manifold system 600 that incorporates a valve similar to that shown in the valve system 100 of FIG. 1A. The system 600 includes a valve body 610 with an inlet port module 612 and an outlet port module 620. Outlet ports 622 are adapted to be coupled to outlet pipes 710. In the embodiment shown, outlet pipes 710 are coupled to destination flanges on destination pipes 712 to transport fluid or other matter transported through the valve body 610. Opening 613 is formed in inlet flange 614 and is adapted to be coupled to inlet pipe 700 to allow fluid to enter the valve body 610 through the opening 613.

The port selector 630 is disposed within the valve body 610 to allow the selective manipulation of the fluid passing through the manifold system 600. For example, an actuator coupling 644 disposed about the port selector 630 may be acted upon by an external actuating means, such as a gear, belt, chain, or other suitable actuating means, so that the port selector 630 and a flow path formed there through (not explicitly shown) may be aligned with one of the plurality of outlet ports 622 to allow the communication of fluid or other matter from the opening 613 via the inlet pipe 700 through the manifold system 600 to a destination pipe 712.

Figure 7A:
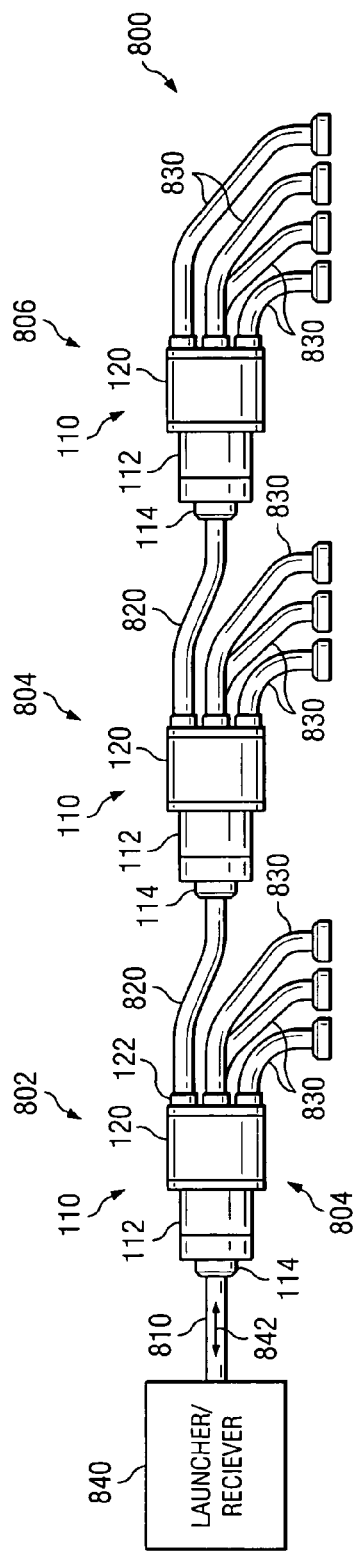
FIG. 7A is a multiple pipe line administration system that implements a series configuration.
Figure 7C:
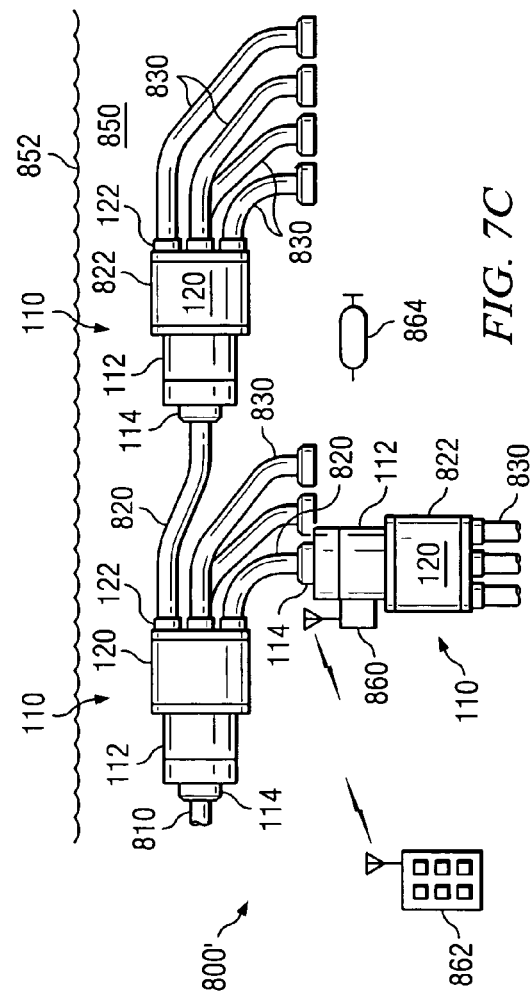
FIG. 7C is a multiple pipe line administration system that is adapted to operate below the surface of a body of water.

FIGS. 7A through 7C illustrate various implementations of a multi-port valve system for managing multiple pipe lines. Referring to FIG. 7A, a system 800 includes multiple multi-port valves 110 arranged in a series configuration. At least one of the valve systems, such as the illustrated launcher valve 802, may be coupled to a launcher/receiver 840 via a launcher/receiver line 810. Alternatively, the launcher valve 802 may be coupled to an alternative fluid source, such as a standard flow pump or other suitable fluid source. The launcher/receiver 840 may be operable to launch, receive, or launch and receive a pipeline scraper, also known as a pipe line pig, for use in cleaning pipe lines, or "lines" coupled thereto. In the implementation shown, the launcher line 810 is coupled to the inlet port flange 114 of the launcher valve 802. The launcher valve 802 includes various features similar to those discussed with respect to FIGS. 1A through 5B above, including a port selector disposed within the valve body 110 and adapted to rotate a flow path to communicate fluid or other matter between the inlet port flange 114 and one of the plurality of outlet ports 122.

A launcher line 810 couples the launcher/receiver 840 to the launcher valve 802. A pipeline scraper 842 may be adapted to proceed into the valve body 110 of the launcher valve 802 through the flow path disposed therein (not explicitly shown) to a selected outlet port 122 of the launcher valve 802.

Multiple lines may be coupled to the various outlet ports 122 of any of the valve systems 802, 804, or 806 illustrated by FIG. 7A. For example, a valve line 820 may be coupled to one of the plurality of outlet ports 122 of the launcher valve 802 and connect the launcher valve 802 via the pipe line 820 to the inlet port flange 114 of an additional down-line valve system 804 located down line from the launcher valve 802. Alternatively, a plurality of outlet pipe lines 830 may be coupled to the plurality of ports 122 that couple the outlet port 122 to a fluid destination. The fluid destination may be a wellbore, a pipe system, or other conduit system that requires cleaning by a pipeline scraper or similar device. Alternatively, for non-pipeline scraping applications, the fluid destination may be any suitable fluid destination, such as a tank, wellbore, underground reservoir, or other destination.

In the implementation illustrated by FIG. 7A, the plurality of valves, including the launcher valve 802 and the down line valves 804 and 806 are each connected in series. Thus, in operation, the launcher valve 802, which is coupled to the launcher/receiver 840 may receive and direct a pipeline scraper 842 from the launcher/receiver 840 to any of a number of fluid destinations. One example of a fluid destination is a down line valve 804 or 806. Each of the valves 802, 804 and 806 are illustrated with a valve line 820 coupling an outlet port of the previous valve to the inlet port flange 114 of a subsequent valve as the valve progresses away from the launcher/receiver 840. Therefore, any number of valves may be used, such that the number of fluid destinations using the system as illustrated in 800 could be unlimited.

FIG. 7B illustrates a system 800' in which a plurality of valves are operated in parallel. Similar to the valves illustrated in FIG. 7A, the valves illustrated in FIG. 7B incorporate similar features to those of the valve systems illustrated in FIGS. 1A through 5B. In operation, a line 810 couples a launcher/receiver valve 802 to a launcher/receiver, such as the launcher receiver 840 illustrated by FIG. 7A. Each of the outlet ports 122 may be coupled to the inlet port flange 114 of a subsequent valve 822, which is down line from the launcher/receiver valve 802. Thus, each of the valves 822 is operating in parallel in the system 800' illustrated by FIG. 7B. The pipeline scraper 842 as illustrated by FIG. 7A may operate within the system 800' of FIG. 7B based on the selected flow path position within the launcher/receiver valve 802 and/or the flow path or port selector position selected in each of the subsequent valves 822. As illustrated, system 800' also includes a third set of valves 832 operated in parallel down line from any one of the valves 822. Accordingly, each valve line 820 is adapted to connect a outlet port 122 of a preceding valve in the system 800' to a subsequent valve down line from the proceeding valve. Additionally, a plurality of lines 830 may be present on any one of the valves to couple one of the valves to a fluid destination. The valve lines 820 are valve-to-valve lines whereas the pipe lines 830 are valve-to-fluid destination lines.

FIG. 7C illustrates a valve system 800', which operates at least partially under the surface 852 of a body of water 850. Additionally, the system 800' illustrates a combination series and parallel configuration in which multiple valve lines 820 connect a single valve to the inlet port flange 114 of multiple down line valves 822. Accordingly, other lines 830 may connect the outlet ports 122 of the valves 802 or 822 of system 800' to fluid destinations. Additionally, a remote controlled actuator may be disposed within the valve body 110 of one or more of the valves 802 or 822 of system 800'. Such a remote controlled actuator may also include a remote transceiver 862 operable to communicate with a valve transceiver 860 coupled to the valve 822, which may allow a user to manipulate the remote actuator from a location other than at the location of the valve 822. Alternatively, a remote operated vehicle or "ROV" 864 may be used to manipulate the actuator at the valve location, to prevent individuals from having to go to the valve location under the surface 852 of the body of water 850.

In any of the systems illustrated in FIG. 7A through 7C, the valves may operate in either direction. For example, the launcher/receiver may either propel the scraper 842 from the launcher/receiver to a fluid destination, or if the flow is reversed within the system, the launcher/receiver 840 may receive the pipeline scraper 842 from the fluid destination, thus making the fluid destination a fluid source and the launcher/receiver 840 a receiver 840.

Referring now to FIGS. 8 through 11, there is illustrated a multi-port flow selector valve 900 and manifold system 1000. The valve 900 is an inline flow combining and diverting device that combines flow from multiple inlets 922 for flow to one common production outlet 970. The valve 900 provides a mechanism to individually isolate and divert flow from one of the multiple inlets 922 to alternate test outlet 980. The test outlet flow paths 936 and 966 are parallel to the inlet flow paths 956 and 937, thereby providing a compact piping arrangement for manifold system 1000.

Figure 10:
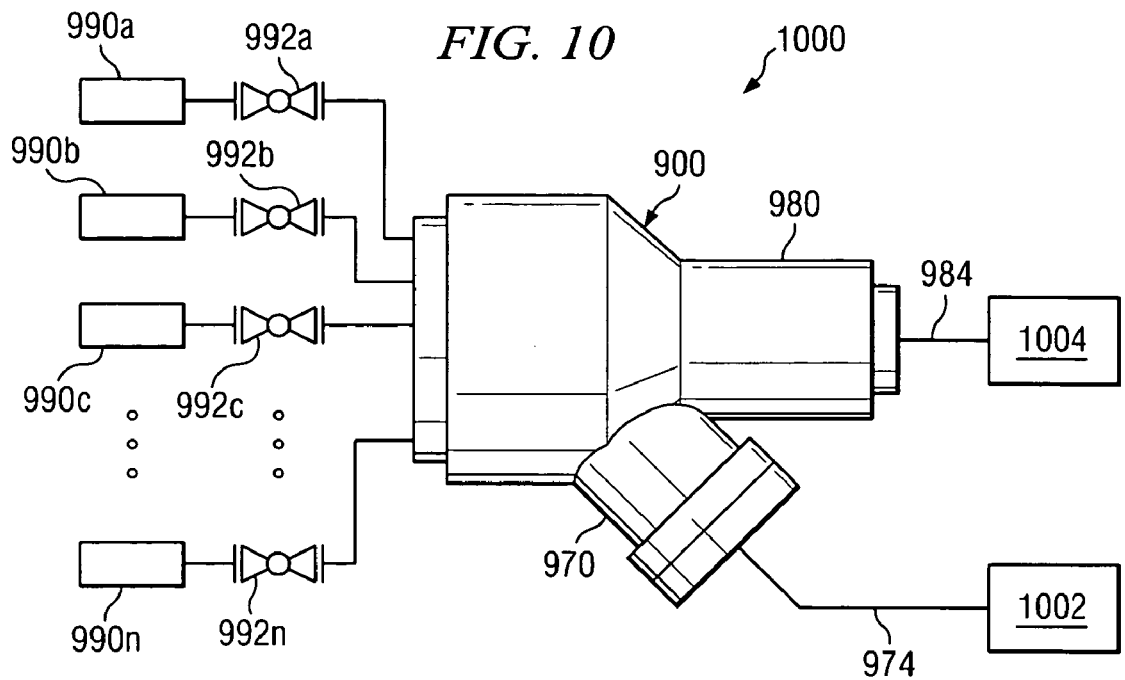
FIG. 10 is a schematic illustrating the manifold system of FIG. 9.

The inlets 922 and corresponding inlet ports 924 are adapted to be coupled to one or more production sources, such as any number of production sources 990a through 990n (FIG. 10). The production sources 990 may include oil wells, gas wells, oil and/or gas storage facilities, water wells, water storage facilities, fluid storage containers, or other production sources.

Production control devices 992a through 992n may be placed between the production source(s) 990 and the manifold valve 900 to control flow from the production source(s) 990. A production control device may include but is not limited to control valves, pumps and compressors.

The manifold valve 900 includes many analogous features as have been described previously herein and illustrated in FIGS. 1 through 4. Referring now to FIGS. 8A and 8B, the valve 900 includes a valve body 910. A port selector 930 is rotatably disposed in body 910. An outlet port body section 916 is adapted to partially enclose the port selector 930. In the embodiment shown, the outlet port body section 916 includes an open yoke 946. The port selector 930 is coupled to the outlet port body section 916 via bushings 940. Seals 942 may also be included to prevent fluid from leaking out of the outlet body section 916.

The outlet port body 916 may also include a bearing 918 for rotatably coupling outlet body 916 to the port selector 930.

The valve 900 includes an inlet port body section 921. A plurality of welded inlet ports 924 are formed on an inlet plate 926. The inlet ports 924 are shown as welded inlet ports 924, but any suitable type of connector for the inlet port may be used. Welded inlet ports 924 define inlets 922. The welded inlet ports 924 may be spaced radially outward from the central axis of the port selector, herein labeled the "X-X" axis. In one implementation, inlet plate 926 is attached to the inlet body 921 using fasteners 928. The fasteners 928 may be any suitable type of fastener, such as a screw, bolt, nut and bolt assembly, or other suitable fastener. In other implementations, the inlet plate 926 may be attached to inlet body 921 by other means of attachment, including welding or clamping devices.

The port selector 930 may be a rotatable member that includes a flow path 932 formed within, such that the flow path 932 may allow the transfer of fluid from one or more inlet ports 924 to test outlet 980. The port selector 930 is disposed within the valve body 910. The flow path 932 formed within the port selector 930 has a path inlet portion 927, a path outlet portion 939, and an offset path portion 938.

Offset portion 938 includes a longitudinal flow direction Y-Y that preferably defines an angle θ of less than 90 degrees from the central longitudinal axis X-X, so that the flow path 930 may be operable to provide communication between one of the inlet opening 922 and test outlet 980. The offset portion 938 is angled so that as the port selector 930 is rotated within the valve body 910, the path inlet 927 may be aligned with one of the plurality of inlet ports 924.

Additionally, a blinded inlet 950 may be formed in the endplate 926 (FIG. 8B) such that when the path inlet 927 is aligned with the blinded inlet 950, no fluid may exit the test outlet 980, allowing each of the production sources 990 to communicate with the production cavity 952. As shown in FIGS. 9A and 9B, there may be a blind inlet 950 disposed in inlet plate 926 between each of the inlet ports 924. Alternatively, only one blind inlet 950 or no blind inlet 950 may be included in the manifold valve 900.

When the rotatable port selector 930 is properly aligned with an inlet 922, fluid from the inlet port 924 flows through the flow path 932 in the port selector 930 to the test outlet 980 and on to the test header 982. The flow from the inlet port 924 aligned with flow path 932 in the port selector 930 may be isolated from the flow entering the production cavity 952 from the other inlet ports 924 through the use of a pressure isolating seat 954 or other suitable seating mechanism, such as a spring/pressure energized seat that creates a seal between the port selector 930 and the inlet path 927 by maintaining contact against the opening of the inlet path 927 through back pressure created by fluid flowing through the flow path 932 or other suitable sealing mechanism.

In the embodiment shown in FIG. 8A, an actuator coupling 944 is disposed circumferentially about the port selector 930. In the configuration illustrated, the open yoke 946 allows rotational energy to be transmitted from a rotation power source (not shown) via a chain, belt, gear, or other suitable connector to engage the teeth 948 of the actuator coupling 944. As the port selector 930 is rotated within the valve body 910, the inlet path 927 may be aligned with one of the plurality of inlet ports 924 in the end plate 926. This alignment allows fluid to pass through open inlets 922.

In the embodiment shown, the port selector 930 is operable to align the flow path 932 with one of three open inlets 922 (the other inlets being blinded), although in other embodiments, there may be more or less than three blind inlets 950 and open inlets 922. The multi-port selector valve 900 also includes a trunnion 960 adapted to rotatably couple the port selector 930 to the body 921. The trunnion pin 960 may be either adapted to insert into corresponding pin recess 964 formed in a portion of the body 921 and a port selector recess 962 formed in the port selector 930. Alternatively, the trunnion pin may be formed integrally with either the port selector 930 and adapted to be inserted in the pin recess 964 or as part of the body 921 and inserted into the port selector recess 962. It will be understood that, alternatively, valve 900 may not include trunnion 960 as the pressure in flow path 932 provides the necessary pressure for sealing port selector 930 to inlet port 924 in a manner analogous to that heretofore described with regard to FIG. 4A.

An advantage of the offset portion 938 having an angle θ less than 90 degrees is that certain operations, such as launching or receiving a pipe scraper through the manifold system 1000, are possible. A pipe scraper, or pipe line "pig" as they are commonly referred to in the petroleum industry, is routinely propelled through the pipes from a pipe line launcher in production operations by using pressurized fluid as a propellant. Additionally or alternatively, the pipeline scraper could be coupled to a pipeline scraper receiver. In accordance with the present invention, the smaller the angle θ, the less the amount of resistance a pipe scraper, or pipe line "pig" encounters when passing through the valve. Accordingly, an angle θ of greater than 90 degrees may be prohibitive in certain applications. The pipeline scraper may be propelled from the launcher or toward the receiver using a pressurized fluid source.

Other advantages of having a longitudinal flow path with an θ angle of less than 90 degrees to the first flow path include minimizing scale and paraffin deposition in the flow path due to minimizing pressure drop in the offset position 938; minimizing erosion of the internal walls of the flow path in the offset portion 938; and reducing the likelihood of cavitation in the offset portion 938.

It will be understood that the present invention may use known gate valve and ball valve technology for the sealing mechanism. The inlet end of the selector valve 900 has a flat face surface on which the bore selector seats as it is aligned over the inlet. It will be understood that any input device such as a gear operator, actuator or lever may provide rotational input to the bore selector to index between the inlet bores.

Figure 9:
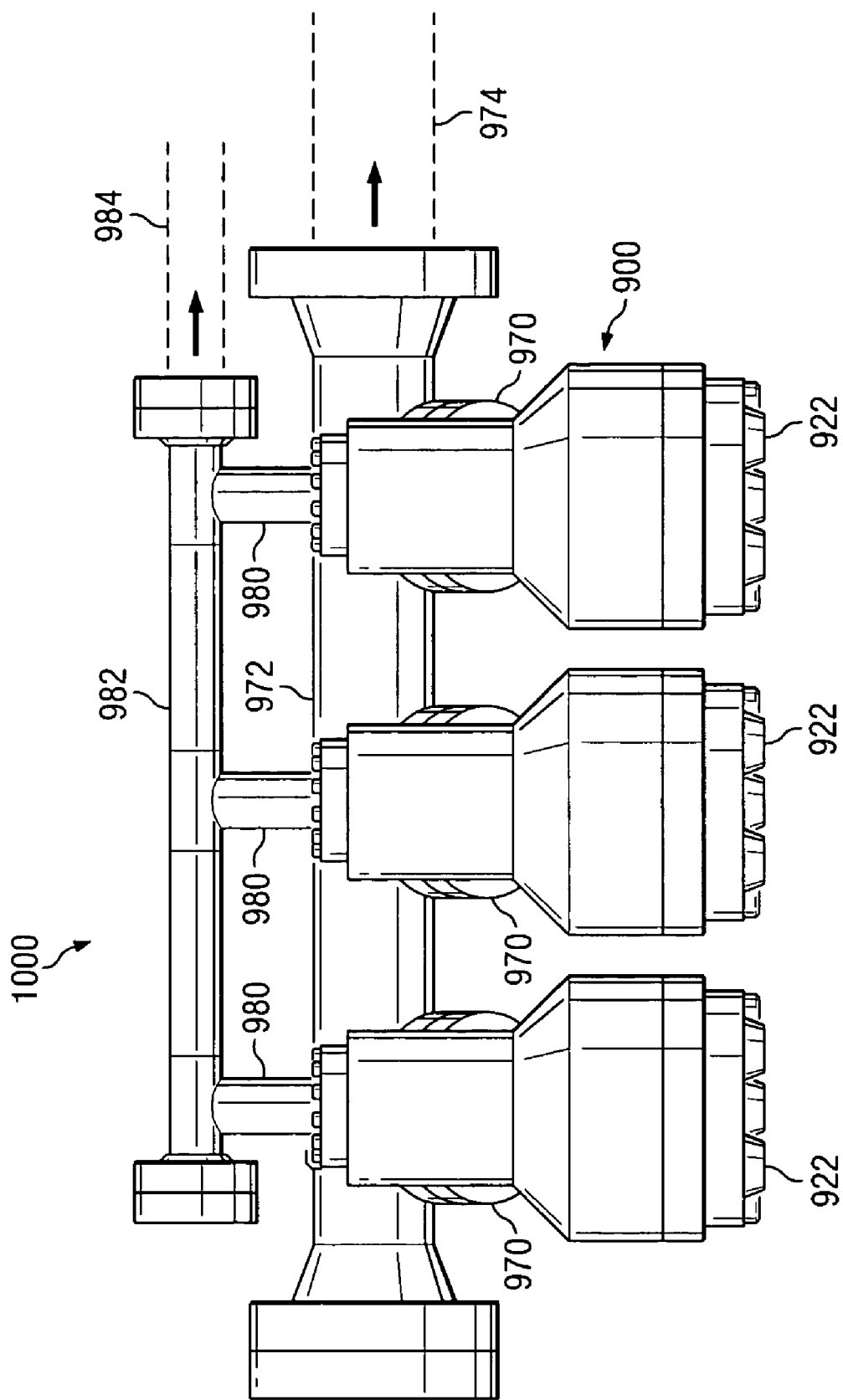
FIG. 9 is a plan view of a manifold system incorporating the multi-port flow selector manifold valve of FIG. 8A.

Referring now to FIGS. 9 and 10, in operation, the production test header 982 may be coupled to a test line 984, which may be coupled to test equipment 1004. The production test line may be operable to communicate the fluid produced from the selected inlet port 924 through inlet port 924, through the flow paths 927, 932 and 939 into the test outlet line 980 and into the test header 982 for testing or other suitable purposes at the test equipment 1004. If connected to fluid sources 990, the remaining inlet ports 924 may communicate fluid from production sources 990 the production cavity 952 in production direction 976 into the production outlet 978 and into the production outlet line 970. The production cavity 952 may allow fluid or gas produced from the inlet ports 924 not connected to the test outlet 980 to mix prior to entering the production outlet 978 and the production header 972. The production outlet line 970 may be coupled to the production header 972 or other suitable production destination. The production header 972 may be connected to a production line 974 to a further production location, such as production equipment 1002 shown in FIG. 10.

Rotation of the port selector 930 between the inlet ports 924 may allow the flow path 932 to be selectably aligned with any of the inlet ports 924 to communicate fluid or other matter through the flow path 932 into the test header 982 from the selected inlet ports 924. It should therefore be understood that each of the inlet ports 924 may direct fluid from its respective production source into the test header 982 for testing, without interrupting the production via the other inlet ports 924 through the production cavity 952 into the production header 972 and the production line 974 to production equipment 1002.

It should also be understood that any number of inlet ports 922 and corresponding inlets 924 may be included in an implementation of the manifold system 1000. Accordingly, the manifold valve 900 may include two, three, four, or more inlets 922 and inlet ports 924, each of which is capable of production to the production header 972. Each of the inlet ports 924 is also connected to a corresponding inlet path 927. In the implementation shown, each of the inlet paths 927 is substantially parallel to each of the other inlet paths 927. Additionally, the inlet paths 927 are substantially parallel to the flow path outlet 939 and the test outlet 980, and displaced by an angle θ, which may be 90 degrees or less. Accordingly, multiple fluid sources 990 may be coupled to the manifold valve system 1000 in a parallel or substantially parallel configuration.

FIGS. 9 and 10 illustrate a manifold system 1000 that includes a plurality of manifold valves 900. In the implementation shown, each of the manifold valves 900 is coupled to a corresponding production outlet 970 and a corresponding test outlet 980. Respectively, each production outlet 970 and test outlet 980 is coupled to a production header 972 and a test header 982. The production header 972 and test header 982 may be coupled to a production line 974 and a test line 984, respectively, to transport fluid communicated through the manifold valve 900 to production equipment and test equipment. Production equipment may include, but is not limited to compressors, storage facilities, oil and gas separators, and other applicable production equipment in the production of oil, gas, water, or other fluids. Test equipment may include oil, gas and water separators, hydrocarbon analysis equipment; moisture analysis equipment, or other test equipment, including pressure sensors, etc.

Figure 11:
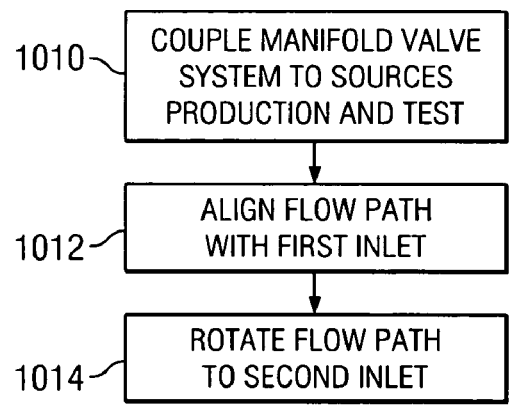
FIG. 11 is a flow chart illustrating a method of simultaneous production and testing with a manifold system incorporating the multi-port flow selector manifold valve of FIG. 8.

FIG. 11 illustrates a method for simultaneous production and testing of fluids from multiple fluid sources. At step 1010, a manifold valve system 1000, such as manifold valve 900 is coupled to a plurality of sources, a test header, and a production header. At step 1012, the a flow path disposed within the body of the manifold valve system is selectably aligned with one of the plurality of inlets in the manifold valve system to provide communication between the selected inlet and the test header. At step 1014, the flow path is selectably rotated to a different inlet to provide communication between the second inlet and the test header. During performance of implementations of the present method, each of the non-selected inlets coupled to production sources may be adapted to communicate through the manifold valve system to the production header.

The design illustrated in FIGS. 8 through 11 provides an inline flow path between multiple inlets and a single diverting outlet. The present design offers a more compact solution than existing prior art multi-port selector valves by providing an offset flow path through the valve that allows the inlet and outlet piping to run parallel to each other. In addition, the inline flow path arrangement of the present invention allows multiple embodiments of the present invention.

A number of embodiments of the invention have been described. Nevertheless, it will be understood that various modifications may be made without departing from the spirit and scope of the invention. Accordingly, other embodiments are within the scope of the following claims.

What is claimed is:

1. A method for simultaneous production and testing of fluids comprising:

flowing a fluid through at least one multi-port flow selector manifold valve from a plurality of fluid sources, wherein the manifold valve includes:
  a plurality of inlet ports, each of the plurality of inlet ports adapted to be coupled to one of the plurality of fluid sources;
  a test outlet, the test outlet adapted to communicate with at least one of the plurality of inlet ports;
  a production outlet, the production outlet adapted to communicate with at least one of the plurality of inlet ports;
  a flow path rotatably disposed between the test outlet and the plurality of inlet ports, wherein the flow path is rotatably alignable with each of the plurality of inlet ports, the flow path including:

an inlet flow path adapted to communicate with one of the plurality of inlet ports, the inlet flow path having a longitudinal direction of flow;

an outlet flow path adapted to communicate with the test outlet, the outlet flow path having a direction of flow substantially parallel to the inlet flow path direction of flow; and an offset portion disposed between the inlet flow path and outlet flow path, wherein the offset portion has a direction of flow with an angle of less than 90 degrees with the direction of flow in the outlet flow path; and an actuator coupling disposed about the outlet flow path;

a first seal disposed about the outlet flow path upstream from the actuator coupling; and a second seal disposed about the outlet flow path downstream from the actuator coupling.

2. The method of claim 1, wherein the plurality of inlet ports are substantially parallel.

3. The method of claim 1, comprising the step of selectively aligning the flow path with a first inlet port of the plurality of inlet ports, the alignment providing fluid communication between the selected inlet and a test header, the alignment further providing communication between each of the non-selected inlet ports and a production header.

* * * * *